(12) United States Patent
Cho et al.

(10) Patent No.: US 7,308,441 B2
(45) Date of Patent: Dec. 11, 2007

(54) APPARATUS AND METHOD FOR PROVIDING REAL-TIME INFORMATION

(75) Inventors: Mi-Hwa Cho, Seoul (KR); Myung-Rai Choi, Seongnam-Shi (KR)

(73) Assignee: Magiceyes Digital Co. (KR)

( * ) Notice: Subject to any disclaimer, the term of this patent is extended or adjusted under 35 U.S.C. 154(b) by 620 days.

(21) Appl. No.: 10/451,604

(22) PCT Filed: Mar. 30, 2001

(86) PCT No.: PCT/KR01/00526

§ 371 (c)(1),
(2), (4) Date: Jun. 19, 2003

(87) PCT Pub. No.: WO02/50701

PCT Pub. Date: Jun. 27, 2002

(65) Prior Publication Data

US 2004/0073646 A1      Apr. 15, 2004

(30) Foreign Application Priority Data

Dec. 21, 2000  (KR) ............................... 2000-79898

(51) Int. Cl.
*G06F 17/30* (2006.01)
(52) U.S. Cl. ................... 707/3; 707/1; 707/10
(58) Field of Classification Search ............ 707/1, 707/3, 10
See application file for complete search history.

(56) References Cited

U.S. PATENT DOCUMENTS 6,011,895 A * 1/2000 Abecassis ............... 386/69

(Continued)

FOREIGN PATENT DOCUMENTS

KR    10-2000-0017754 A    4/2000

(Continued)

OTHER PUBLICATIONS

PCT International Search Report for International application No. PCT/KR01/00526; Sep. 11, 2001.

(Continued)

*Primary Examiner*—Don Wong
*Assistant Examiner*—Thanh-Ha Dang
(74) *Attorney, Agent, or Firm*—Cantor Colburn LLP

(57) ABSTRACT

An apparatus for providing real time information includes a data receiver for receiving status information data and an information user's data request message on the status information data in real time, the status information data consisting of either video data or data obtained by combining video data with at least one of audio data and text data and being indicative of temporal status information on an arbitrary area and theme; a data base management system (DBMS) for sorting the status information data received through the data receiver in accordance with a corresponding area and theme and managing them in a temporal order; a data base (DB) retrieval unit for retrieving the DBMS to extract status information data corresponding to a theme and area selected by the information user, if the data request message is received through the data receiver; a data transmitter for transmitting the status information data extracted from the DB retrieval unit to the information user; and a controller for controlling the data transmitter, the data receiver, the DB retrieval unit, and the DBMS to manage the status information data for the area and theme based on the temporal order and to provide the information user with corresponding status information data, if the data request message is received from an arbitrary information user. The controller selects only the latest information from a list of the extracted status information data to provide to the arbitrary information user.

12 Claims, 11 Drawing Sheets

U.S. PATENT DOCUMENTS

| | | | |
|---|---|---|---|
| 6,014,694 A * | 1/2000 | Aharoni et al. | 709/219 |
| 6,370,543 B2 * | 4/2002 | Hoffert et al. | 707/104.1 |
| 6,442,538 B1 * | 8/2002 | Nojima | 707/1 |
| 6,546,405 B2 * | 4/2003 | Gupta et al. | 715/512 |
| 6,567,847 B1 * | 5/2003 | Inoue | 709/219 |
| 6,658,414 B2 * | 12/2003 | Bryan et al. | 707/9 |
| 6,813,618 B1 * | 11/2004 | Loui et al. | 707/5 |
| 6,912,544 B1 * | 6/2005 | Weiner | 707/104.1 |
| 6,965,890 B1 * | 11/2005 | Dey et al. | 707/4 |
| 6,983,050 B1 * | 1/2006 | Yacobi et al. | 380/210 |
| 2003/0033296 A1 * | 2/2003 | Rothmuller et al. | 707/3 |
| 2004/0236650 A1 * | 11/2004 | Zapiec et al. | 705/32 |

FOREIGN PATENT DOCUMENTS

| | | |
|---|---|---|
| KR | 10-2000-0024282 A | 5/2000 |
| KR | 10-2000-0037347 A | 7/2000 |
| KR | 10-2000-0037469 A | 7/2000 |
| KR | 10-2001-0044215 A | 6/2001 |

OTHER PUBLICATIONS

PCT International Preliminary Examination Report for International application No. PCT/KR01/00526; Nov. 26, 2002.

Korean Intellectual Property Office, PCT International Search Report, Date of Mailing: Sep. 11, 2001.

* cited by examiner

FIG. 1

|  | CNN.com | Selfly.com | Townews.com | Roadi.co.kr. |
|---|---|---|---|---|
| Information user | user who enjoys news | user who desires to receive individual internet broadcasting | user who desires to know area information | driver and person concerned |
| Types of information | News special channel | Making individual broadcasting station | Area information close to real life | Real time traffic information |
| Information provider | 500 overseas collaborators, 24 international correspondent offices, CNN reporters of 37 branch offices | A number of unspecified persons having camcorder and USB camera, interested in private broadcasting | Area information manager of a small number of specified persons | CC TV, taxi driver, unspecified provider |
| Information collecting method | After collecting news using camera and recorder by a small number of specified persons (reporters), draft news and transmit them through E-mail | After transmitting or recording present condition by private editing program, transmit present condition to editing program | Directly and periodically enter writings on E-mail, notice board, morgue, or program by a small number of area residents | Provide screen to CCTV with oral by taxi driver and information provider using mobile terminal/handset |
| Editing method | DG broadcasting equipment, editing system, live relay system | Editing tool mounted on PC (channel selection – recording – storing – file conversion – transmission) | Edit editing materials with digital editing equipment by specialist (web-planner and web designer) and edit materials on web site by information provider | After processing materials, display materials in CCTV screen transmitting system and digital editing system |
| Business type | Provide charged information related to advertisement and news | Install video terminal, rental fee, and sell contents | Advertisement order of area information manager and electronic transaction of area special product | ARS service, PDA service, and traffic information service on vehicle terminal |
| Contents style | Refined news of press | Individual documentary | Subdivision of existing contents such as geography, restaurant, and file information, in accordance with area | Refined information such as road and specialized traffic |
| Point | Wide network | Participation of number of unspecified persons | Subdivision of area information | Information of present condition |

FIG. 4

| IDENTIFICATION INFORMATION (81) | THE NUMBER OF UPLOADED INFORMATION DATA (82) | THE NUMBER OF HIT INFORMATION DATA (83) | FEE INFORMATION(84) |
|---|---|---|---|
| INFORMATION PROVIDER #1 | 5 | 34 | XXX |
| INFORMATION PROVIDER #2 | 30 | 256 | XXXXX |
| INFORMATION PROVIDER #3 | 4 | 17 | XX |
| ... | ... | ... | ... |

FIG. 6

| THEME / AREA | TRABLE 001 | | | LIBRARY 002 | | | CAFÉ 003 | | | ... |
|---|---|---|---|---|---|---|---|---|---|---|
| | DESTINATION IN TRAVEL#1 | DESTINATION IN TRAVEL#2 | DESTINATION IN TRAVEL#3 | LIBRARY #1 | LIBRARY #2 | LIBRARY #3 | CAFÉ #1 | CAFÉ #2 | CAFÉ #3 | ... |
| KANGNAM 01 | DATA (01,001,1) #1 | DATA (01,001,1) #2 | DATA (01,001,1) #3 | DATA (01,002,1) #1 | DATA (01,002,1) #2 | DATA (01,002,1) #3 | DATA (01,003,1) #1 | DATA (01,003,1) #2 | DATA (01,003,1) #3 | ... |
| | DATA (01,001,2) #1 | DATA (01,001,2) #2 | DATA (01,001,2) #3 | DATA (01,002,2) #1 | DATA (01,002,2) #2 | DATA (01,002,2) #3 | DATA (01,003,2) #1 | DATA (01,003,2) #2 | DATA (01,003,2) #3 | ... |
| | ... | ... | ... | ... | ... | ... | ... | ... | ... | ... |
| | DATA (01,001,N) #1 | DATA (01,001,N) #2 | DATA (01,001,N) #3 | DATA (01,002,N) #1 | DATA (01,002,N) #2 | DATA (01,002,N) #3 | DATA (01,001,N) #1 | DATA (01,001,N) #2 | DATA (01,001,N) #3 | ... |
| SHINCHON 02 | DATA (02,001,1) #1 | DATA (02,001,1) #2 | DATA (02,001,1) #3 | DATA (02,002,1) #1 | DATA (02,002,1) #2 | DATA (02,002,1) #3 | DATA (02,003,1) #1 | DATA (02,003,1) #2 | DATA (02,003,1) #3 | ... |
| | DATA (02,001,2) #1 | DATA (02,001,2) #2 | DATA (02,001,2) #3 | DATA (02,002,2) #1 | DATA (02,002,2) #2 | DATA (02,002,2) #3 | DATA (02,003,2) #1 | DATA (02,003,2) #2 | DATA (02,003,2) #3 | ... |
| | ... | ... | ... | ... | ... | ... | ... | ... | ... | ... |
| | DATA (02,001,N) #1 | DATA (02,001,N) #2 | DATA (02,001,N) #3 | DATA (02,002,N) #1 | DATA (02,002,N) #2 | DATA (02,002,N) #3 | DATA (02,001,N) #1 | DATA (02,001,N) #2 | DATA (02,001,N) #3 | ... |

FIG. 7
| SELECTION | KANGNAM | CAFÉ |
- AREA>SEOUL>KANGNAM
- THEME>CAFÉ
| Easy café | KELI café | Davinchi |
|---|---|---|
| [9/20/14:25] Woosung Jeong appears. | [9/28/20:05] There is a pretty girl | [9/22/18:35] Today is crowded with old men. |
|  |  |  |
| ◀◀◀previous  next ▶▶▶ | ◀◀◀previous  next ▶▶▶ | ◀◀◀previous  next ▶▶▶ |

APPARATUS AND METHOD FOR PROVIDING REAL-TIME INFORMATION

TECHNICAL FIELD

The present invention relates to an apparatus and method for providing real time information, and more particularly, to an apparatus and method for providing real time information, in which real time status information data on an arbitrary area and theme are received from an external terminal unit, managed in a temporal order, and provided to arbitrary information users in real time.

BACKGROUND ART

Recently, with increase of the number of portable terminal units such as a cellular phone and the number of Internet users, various apparatuses and methods for providing information based on cable/wireless communication networks have been provided. In this respect, information collected by a record tool on a web, a phone, and a still camera has been conventionally provided to information users through a web site. Alternatively, information collected on on-line or off-line has been provided to information users through a web site after editing and processing steps.

FIG. 1 is a comparison table of conventional sites that provide information users with information.

Referring to FIG. 1, respective sites are constituted in such a manner that a small number of specified persons provide information with a limited theme, and a separate editing means for editing and processing information is required even in case of information obtained by a number of unspecified persons.

In other words, to open information and materials obtained by the public for a number of unspecified information users, it is necessary to edit the information using a separate editing program mounted on a personal computer (PC). Alternatively, it is necessary to request expert editing institutes such as Internet company, in which specialists edit information using an editing equipment, to edit corresponding information. In this case, separate expenses have been required.

Furthermore, even in case of news collected by a small number of specified persons such as news reporters not the public, the news are collected for a constant time period and then opened or transmitted to a number of information users at one time through a separate editing step. In this case, a problem arises in that the respective news cannot be provided in real time.

That is, after real-time information such as news flash or event accident is collected, edited and processed, the information is provided to information users using a means such as web or E-mail at one time. For this reason, the time needed for an information user to receive corresponding information increases.

As described above, the related art method for providing information has several problems. That is, a problem arises in that it is difficult to provide customers who desire to obtain information of various kinds more quickly with such information, due to limitation in collecting and editing information. For this reason, the information users had to obtain limited information only. This makes the information users difficult to timely obtain the information, thereby reducing the value of news or information. Moreover, no methods for easily opening various kinds of information obtained by a number of unspecified persons have been suggested.

DISCLOSURE OF THE INVENTION

Accordingly, the present invention is directed to an apparatus and method for providing real time information that substantially obviates one or more of the problems due to limitations and disadvantages of the related art.

An object of the present invention is to provide to an apparatus and method for providing real time information, in which simultaneous information of various types are collected in real time and corresponding information are managed for area/theme/time, so that arbitrary information users can use various and vivid news or information at desired time.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, an apparatus for providing real time information in accordance with the present invention includes: a data receiver for receiving status information data and an information user's data request message on the status information data in real time, the status information data being consisted of either video data or data obtained by combining video data with at least one of audio data and text data and being indicative of temporal status information on an arbitrary area and theme; a data base management system (DBMS) for sorting the status information data received through the data receiver in accordance with a corresponding area and theme and managing them in a temporal order; a DB retrieval unit for retrieving the DBMS to extract status information data corresponding to theme/area selected by the information user, if the data request message is received through the data receiver; a data transmitter for transmitting the status information data extracted from the DB retrieval unit to the information user; and a controller for controlling the data transmitter, the data receiver, the DB retrieval unit, and the DBMS to manage the status information data for an area and theme based on the temporal order and to provide the information user with corresponding status information data, if the data request message is received from an arbitrary information user.

In another aspect, a method for providing real time information in accordance with the present invention includes the steps of: a) receiving status information data indicative of temporal status information on an arbitrary area and theme, the status Information data being consisted of either video data or data obtained by combining video data with at least one of audio data and text data, sorting the status information data in accordance with an area and theme, and establishing a data base in real time, in which the status information data corresponding to the arbitrary area and theme are temporally aligned; b) retrieving the data base if an information user's data request message on arbitrary status information data stored in the data base is received, and extracting a list of the status information data on area and theme selected by the information user; c) selecting only the latest information from the list of the status information data extracted in the step b) and providing the information user with the latest information; and d) sequentially providing previous information included in the list of the status information data by selection of the information user if the information user requests additional information on corresponding status information.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a comparison table of conventional sites that provide information users with information;

FIG. 4 is a schematic view of information provider data managed by an apparatus for providing real time information in accordance with the embodiment of the present invention;

FIG. 6 is a schematic view of status information data managed by an apparatus for providing real time information in accordance with the embodiment of the present invention;

FIG. 7 is an exemplary view of web page screens for providing an arbitrary information user with status information data in accordance with the embodiment of the present invention;

BEST MODE FOR CARRYING OUT THE INVENTION

Reference will now be made in detail to the preferred embodiments of the present invention, examples of which are illustrated in the accompanying drawings.

Figure 2:
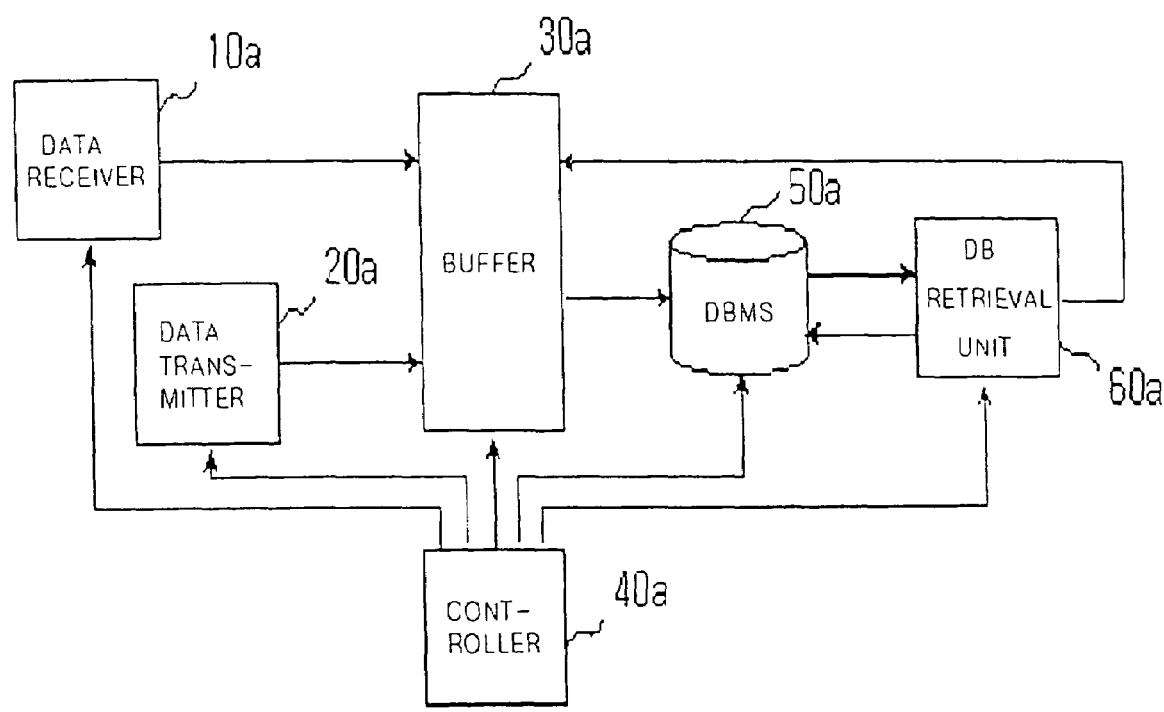
FIG. 2 is a block diagram showing an apparatus for providing real time information in accordance with one embodiment of the present invention.

FIG. 2 is a block diagram showing an apparatus for providing real time information in accordance with one embodiment of the present invention.

Referring to FIG. 2, the apparatus for providing real time information in accordance with the present invention includes a data receiver 10a, a data transmitter 20a, a buffer 30a, a controller 40a, a data base management system (DBMS) 50a, and a data base DB) retrieval unit 60a.

The data receiver 10a serves to receive various data transmitted from an external terminal unit. That is, the data receiver 10a receives status information data and an information user's data request message on the status information data in real time, and transmits them to the DBMS 50a through the buffer 30a. At this time, the status information data are consisted of either video data or data obtained by combining the video data with at least one of audio data and text data. The status information data are indicative of temporal status information on an area and a theme. The DBMS 50a sorts arbitrary status information data transmitted through the buffer 30a under the control of the controller 40a in accordance with a corresponding area and theme, and stores/manages them in a temporal order.

If the data request message by an arbitrary information user is received in the DB retrieval unit 60a through the data receiver 10a, the DB retrieval unit 60a retrieves the DBMS 50a in real time to extract status information data corresponding to theme/area selected by the information user, and transmits the extracted status information data to the buffer 30a.

The data transmitter 20a transmits the status information data extracted from the DB retrieval unit 60a to the information user under the control of the controller 40a.

The controller 40a manages the status information data for an area and theme based on a temporal order. If the data request message is received from an arbitrary information user, the controller 40a controls the data transmitter 20a, the data receiver 10a, the DB retrieval unit 60a, and the DBMS 50a to provide the information user with corresponding status information data in real time.

At this time, the controller 40a selects only the latest information from a list of the extracted status information data and provides the information user with the selected information. If the information user requests additional information on corresponding status information, the controller 40a serves to sequentially provide the information user with previous information included in the list of the status information data by selection of the information user.

Figure 3:
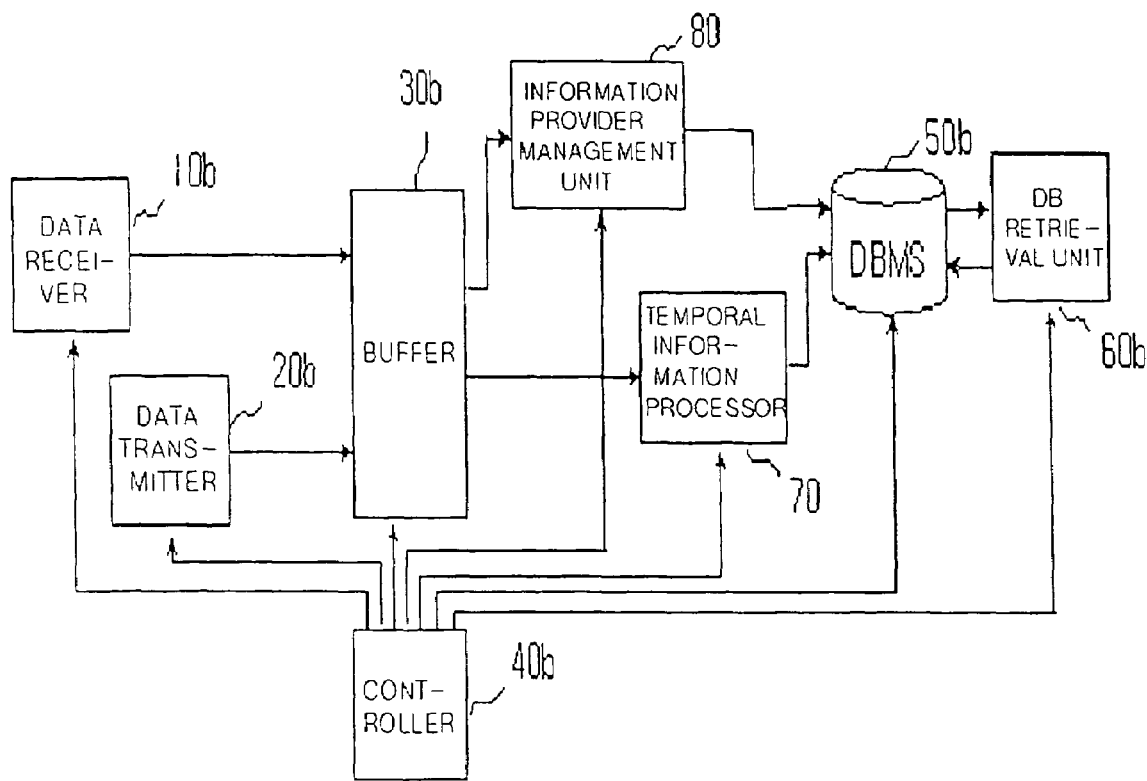
FIG. 3 is a block diagram showing an apparatus for providing real time information in accordance with another embodiment of the present invention.

Meanwhile, FIG. 3 is a block diagram showing an apparatus for providing real time information in accordance with another embodiment of the present invention. Referring to FIG. 3, the apparatus for providing real time information in accordance with another embodiment of the present invention includes a data receiver 10b, a data transmitter 20b, a buffer 30b, a controller 40b, a DBMS 50b, a DB retrieval unit 60b, a temporal information processor 70, and an information user management unit 80.

The data transmitter 10b, the data receiver 20b, the buffer 30b, the DBMS 50b, and the DB retrieval unit 60b respectively act in the same manner as the data transmitter 10a, the data receiver 20a, the buffer 30a, the DBMS 50a, and the DB retrieval unit 60a shown in FIG. 2. Accordingly, their description will be omitted.

The temporal information processor 70 and the information provider management unit 80 will now be described in more detail.

The temporal information processor 70 serves to manage temporal information of an external terminal unit that provides the apparatus for providing real time information according to the present invention with arbitrary information. The temporal information processor 70 includes a real time clock block RTC #1 for setting current temporal information, and synchronizes the external terminal unit with the apparatus of the present invention in accordance with the current temporal information set by the block RTC #1.

At this time, in the same manner as the apparatus for providing real time information according to the present invention, the external terminal unit includes a block RTC #2 for setting current temporal information.

If any error occurs between the block RTC #2 in the external terminal unit and the block RTC #1 in the apparatus of the present invention, the temporal information processor 70 serves to compensate the error based on the time of the apparatus of the present invention. That is to say, in order to temporally synchronize with the external terminal unit, the temporal information processor 70 receives current temporal information t2 of the external terminal unit and compares the current temporal information t2 with current temporal information t1 set therein. At this time, if the two values t1 and t2 are different from each other, the temporal information processor 70 varies the temporal information included in the status information data by the difference value. Also, at the request of the external terminal unit, the temporal information processor 70 varies the temporal information t2 of the external terminal unit based on the current temporal information t1 set therein.

Meanwhile, the information provider management unit 80 serves to calculate fee information for paying a cost to an information provider who provides the apparatus for providing real time information with arbitrary information in real time. If the information provider data is included in the status information data, the information provider management unit 80 counts the number of the status information data uploaded by the information provider referring to the information provider data. If the status information data is hit (accessed by other information user), the information provider management unit 80 counts the number of the hit status information data. Then, the information provider management unit 80 calculates a fee for each information provider in accordance with the counted results so that the DBMS 50b stores and manages the calculated fee information.

FIG. 4 is a schematic view of information provider data managed by the apparatus for providing real time information in accordance with the embodiment of the present invention. Referring to FIGS. 3 and 4, the information provider data transmitted from the information provider management unit 80 to the DBMS 50b includes an identification information field 81, an information uploading field 82, an information hitting field 83, and a fee information field 84. The identification information field 81 stores identification information for a corresponding information provider. The information uploading field 82 stores the number of uploaded information data for the corresponding information provider. The information hitting field 83 stores the number of hit information data on the status information data provided by the corresponding information provider. The fee information field 84 stores a fee calculated based on the number of uploaded information data and the number of hit information data. Therefore, the controller 40b serves to pay an information uploading cost to the corresponding information provider, if necessary, referring to the information provider data exemplarily shown in FIG. 4.

Here, the temporal information processor 70 and the information provider management unit 80 may selectively be provided.

Figure 5:
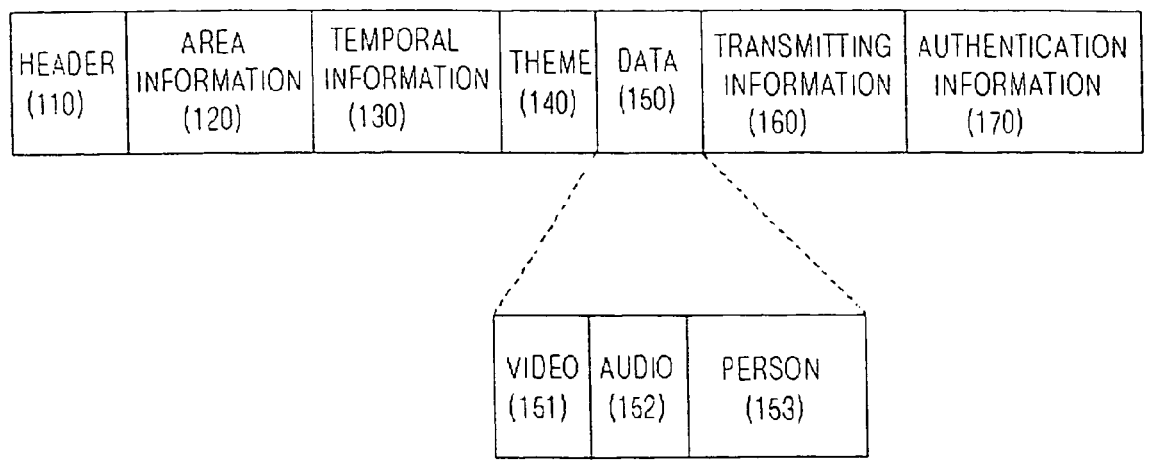
FIG. 5 is a schematic view of data managed by an apparatus for providing real time information in accordance with the embodiment of the present invention.

FIG. 5 is a schematic view of data managed by the apparatus for providing real time information in accordance with the embodiment of the present invention. Referring to FIG. 5, the data managed by the apparatus for providing real time information in accordance with the present invention includes a header field 110 for identifying corresponding data, an area information field 120 indicative of area information on an area where status information data are generated, a temporal information field 130 indicative of temporal information when the status information data are generated, a theme field 140 indicative of a theme of the status information data, a data field 150 indicative of either video data or data obtained by combining video data and at least one of audio data and text data which are contents of the status information data, a transmitting information field 160 indicative of information of an information provider who generates the status information data, and an authentication information field 170 for storing authentication results if authentication on corresponding information is required.

The data field 150 is formed by combining one or more fields between a video data field 151 for video data, an audio data filed 152 for audio data, and a text data field 153 for text data, with one another. The respective data fields have a variable length in accordance with the combining state. The temporal information filed 130 stores temporal information when the video data included in corresponding status information data is generated.

Meanwhile, the authentication information field 170 is generated by the apparatus for providing real time information in accordance with the present invention. After identifying contents of received status information data, if it is determined that improper information (for example, information liable to contravene public order or morality or to injure public health) is included in the received status information data, the authentication information field 170 is separately generated to identify authentication and is added to the status information data transmitted from the external terminal unit. Accordingly, if the authentication information is required, authentication on the received status information data is performed under the control of the controller 40a or 40b and the authentication result is recorded in the authentication information field 170. If corresponding status information data is requested from an arbitrary information user, the controller 40a or 40b identifies contents of the authentication information field 170 in advance. As a result, if the contents are not authenticated, the controller 40a or 40b controls the authentication information field 170 so as not to provide the information user with the contents.

FIG. 6 is a schematic view of status information data managed by the apparatus for providing real time information in accordance with the embodiment of the present invention. FIG. 6 exemplarily shows that the apparatus for providing real time information manages status information data on themes such as travel information, library information, cafe information, and theater information in areas such as 'KANGNAM', 'SHINCHON', and 'ABKUJEONG', in Seoul, Korea. In FIG. 6, numbers in parentheses indicate codes for identifying corresponding items.

Referring to FIG. 6, the apparatus for providing real time information in accordance with the present invention sorts data having the configuration shown in FIG. 5 in accordance with a theme and an area, so as to store and manage the data as shown in FIG. 6. If an arbitrary information user selects area information as 'KANGNAM 01' and also selects a theme as 'CAFÉ 003' to get status information on café in KANGNAM, the apparatus for providing real time information in accordance with the present invention retrieves the DBMS 50a or 50b using code values 01 and 003 as keys and extracts a plurality of café data located in KANGNAM area. In an example of FIG. 6, three café data (data of CAFÉ#1, data of CAFÉ#2, and data of CAFÉ#3) are extracted to provide a corresponding information user with them.

At this time, the controller 40*a* or 40*b* controls the DB retrieval system 60*a* or 60*b* so that the latest information data (for example, DATA(01,003,1) #1 for an item CAFÉ#1) updated based on temporal information of data extracted for each item can be provided to the information user. Also, if the information user requests additional information data on an arbitrary item, the controller 40*a* or 40*b* controls the DB retrieval system 60*a* or 60*b* so that the previous information data (DATA(01,003,1) #2, DATA(01,003,1) #3, etc) of a corresponding item can sequentially be provided to the information user by selection of the information user.

In more detail, if the information user requests café information located in KANGNAM, status information data on three cafés in KANGNAM, which are managed by the apparatus for providing real time information, are extracted, and the latest data DATA(01,003,1) #1, DATA(01,003,2) #1, and DATA(01,003,3) #1 among the status information data are first provided to the information user. At this time, an information type according to the example of FIG. 6 is as shown in FIG. 7. Referring to FIG. 7, the latest status information data on three cafes located in KANGNAM, such as 'EASY CAFE', 'KELI CAFE', and 'DAVINCHI', are displayed in a format of video data and text data having temporal information.

If the information user requests additional information by selecting one of the three cafes, previous status information data on the selected café are sequentially provided to the information user. In an example of FIG. 7, if the information user selects a 'PREVIOUS' or 'NEXT' button in a region indicative of status information data on a desired café, previous or next status information data of the current displayed status information data are selected to be displayed on a status information display region of a corresponding café.

Figure 8:
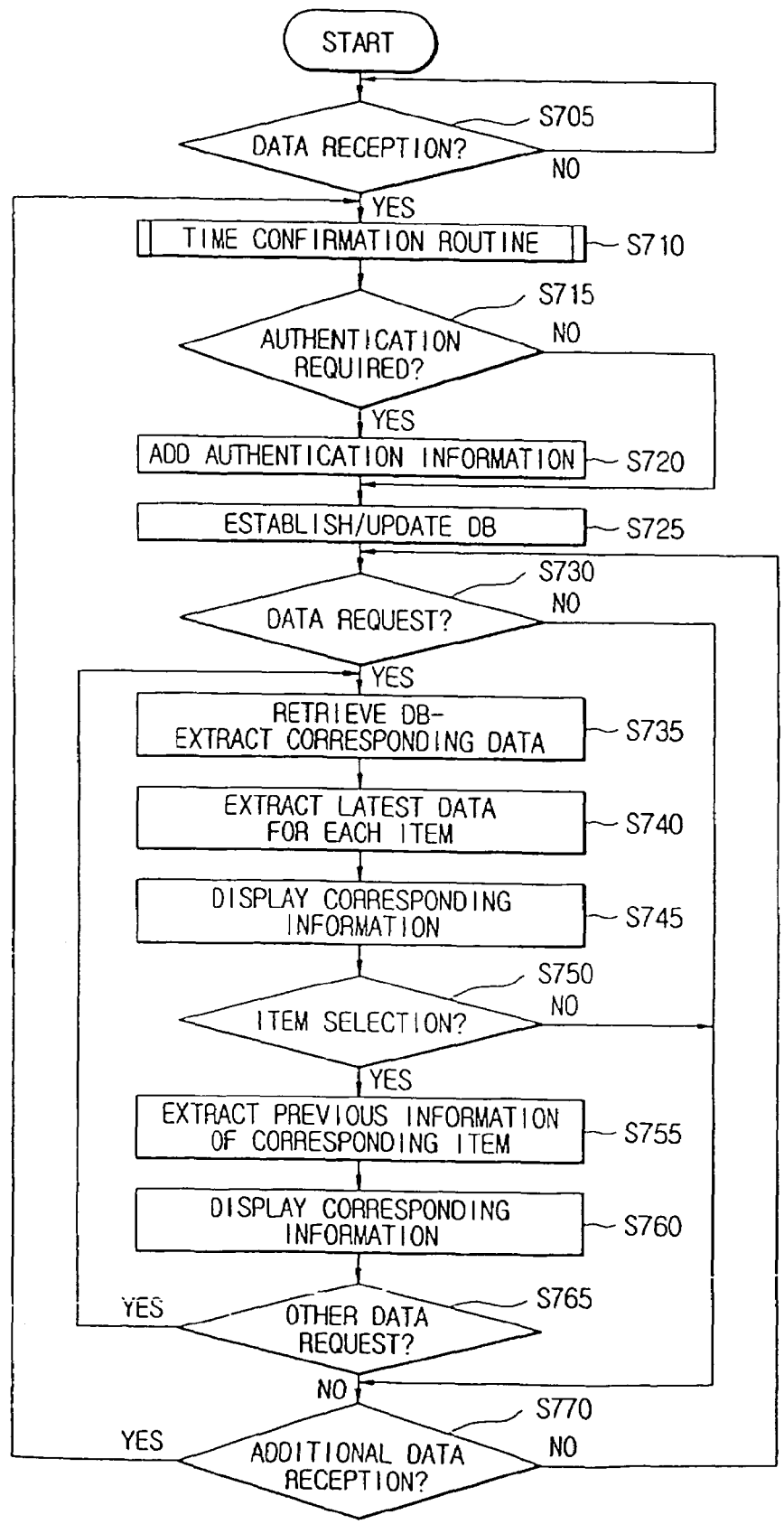
FIG. 8 is a flow chart showing processing steps of providing real time information in accordance with the embodiment of the present invention.

FIG. 8 is a flow chart showing processing steps of providing real time information in accordance with the embodiment of the present invention. That is, a method for providing real time information in accordance with the embodiment of the present invention will now be described with reference to FIG. 8.

If status information data indicative of temporal status information on an area and theme, which are consisted of either video data or data obtained by combining the video data with at least one of audio data and text data, are received, it is identified whether temporal information included in the status information data is valid and a time confirmation routine thereof is performed in steps s705 and s710. In other words, a value of the current temporal information of the external terminal unit is compared with a value of the current temporal information stored in the apparatus for providing real time information according to the present invention. If the two values are different from each other, the temporal information included in the status information data received from the external terminal unit is compensated by the difference value.

Next, area and theme information included in the received status information data are identified to sort the received status information data in accordance with a corresponding area and theme, thereby establishing a data base in which status information data corresponding to an arbitrary area and theme are temporally aligned, in step s725.

At this time, if improper information is included in the status information data, authentication on the status information data is performed and then a step of adding authentication information to the status information data is selectively performed in steps s715 and s720.

As described above, if the database is primarily established, it is ready to receive a data request message or an additional information message on the established database from an arbitrary information user.

If a data request message on arbitrary status information data stored in the database is received from an arbitrary information user, the database is retrieved based on the received data request message and a list of the status information data requested by the information user is extracted in steps s730 and s735. The latest status information is extracted from each item of the extracted status information data and then displayed for the information user in steps s740 and s745. If the information user generates an additional information request message on an arbitrary item after identifying the item in which the orovided status information data is included, previous status information data of the item is extracted by manipulation of the information user and then corresponding status information data is displayed in steps s750 to s760. At this time, the information user can retrieve desired information while moving a cursor to a previous or next button.

The above steps s710 to s760 are repeated until other data are requested from the information user in step s765 or additional data provided by an arbitrary information provider are received in step s770. If additional data are received in step s770, contents of the primarily established database in the step s725 are updated based on the corresponding status information data.

Meanwhile, when the corresponding data extracted in the steps s745 and s760 are displayed, it is identified whether authentication information has been added to the extracted data. If the authentication information has been added to the extracted data, it is identified whether authentication on corresponding data has been performed in the authentication information field, so as not to provide the information user with the data that have not been authenticated.

Furthermore, to widely use the method for providing real time information according to the present invention, it is necessary for a number of unspecified information providers to massively provide information on an arbitrary theme. To this end, in the present invention, there is suggested a method for paying a cost to information providers that provide arbitrary information, in accordance with the number of uploaded information data and the number of hit information data. Accordingly, if the information provider data are provided together with status information data on an arbitrary theme, the number of uploaded information data and the number of hit information data for each information provider are stored and managed in a separate database referring to the information provider data. Afterwards, the number of uploaded information data and the number of hit information data are counted for a corresponding information provider, and fee data for paying a cost to the corresponding information provider are calculated in accordance with the counted result. In the present invention, the method for calculating fee data is not limited to a particular method.

Figure 9:
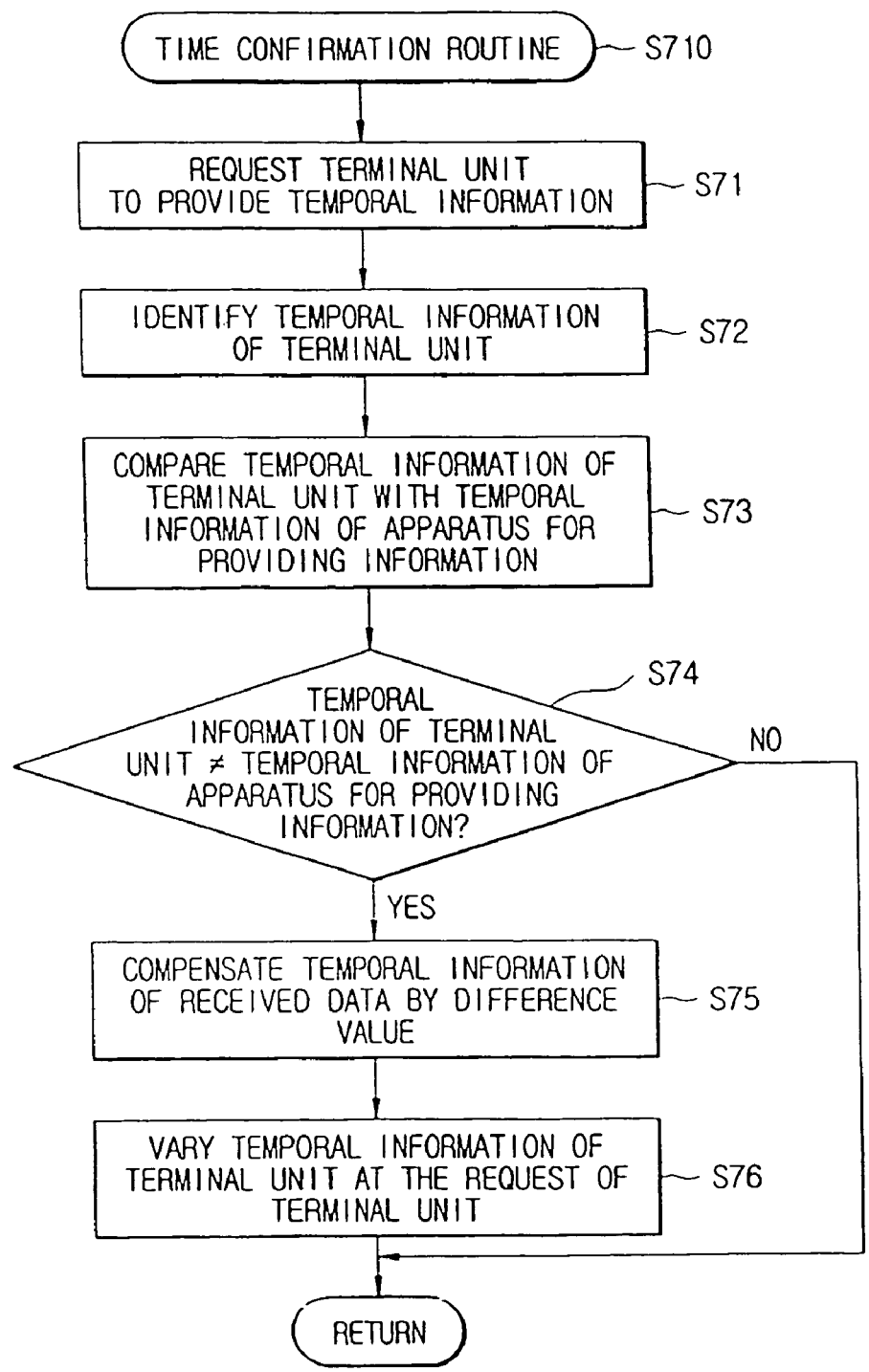
FIG. 9 is a flow chart showing processing steps of managing temporal information of a terminal unit in accordance with the embodiment of the present invention.

Meanwhile, FIG. 9 is a flow chart showing processing steps of managing temporal information of the terminal unit in accordance with the embodiment of the present-invention. Processing steps of the time confirmation routine (s710) shown in FIG. 8 will be described in more detail with reference to FIG. 9.

First, to identify validity as to whether time of the external terminal unit that generated the status information data is correct, the external terminal unit is requested to provide current temporal information so that the current temporal information t1 managed by the apparatus for providing real time information and the current temporal information t2 transmitted from the external terminal unit are compared with each other in steps s72, s72 and s73. As a Lesuit, it the current temporal information t2 of the external terminal unit and the current temporal information t1 are different from each other, temporal information included in the status information data received from the external terminal unit is varied by the difference value in steps s74 and s75. That is, the temporal information included in the received status information data is compensated by the difference value. At the request of the external terminal unit, the current temporal information of the external terminal unit is varied based on the current temporal information managed by the apparatus for providing real time information according to the present invention in step s76.

Figure 10:
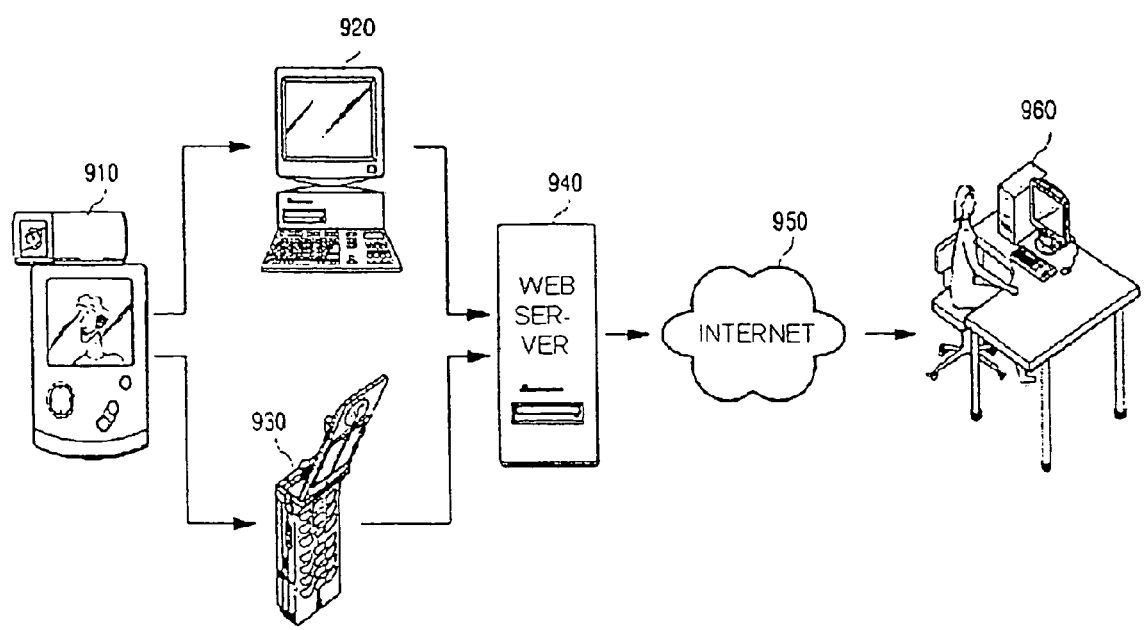
FIG. 10 is an exemplary view of a real-time information management system implemented based on the apparatus of the present invention.

FIG. 10 is an exemplary view of a real-time information management system implemented based on the apparatus of the present invention. Referring to FIG. 10, the real-time information management system includes a web server 940 adapted for the apparatus for providing real time information in accordance with the present invention, a terminal unit 910 used by a number of unspecified users, for generating video data, audio data, and text data on desired data in real time, and a communication equipment (for example, a PC 920 or a cellular phone 930) which transmits various data generated by the terminal unit 910 to the web server 940. The real-time information management system can serve to provide arbitrary information users who use the terminal unit 910 or a separate terminal unit, with corresponding data through an Internet 950.

In more detail, after a number of unspecified persons generate status information data on a theme in an area where they are located, using the terminal unit 910, they transmit the status information data to the web server 940 using the communication equipment such as the PC 920 or the cellular phone 930. At this time, the web server 940 stores and manages the status information data in the same manner as the methods described with reference to FIGS. 8 and 9. Also, if a number of unspecified information users 960 who use the Internet 950 request arbitrary status information data, the web server 940 retrieves corresponding data to provide corresponding information users 960 with them.

Figure 11:
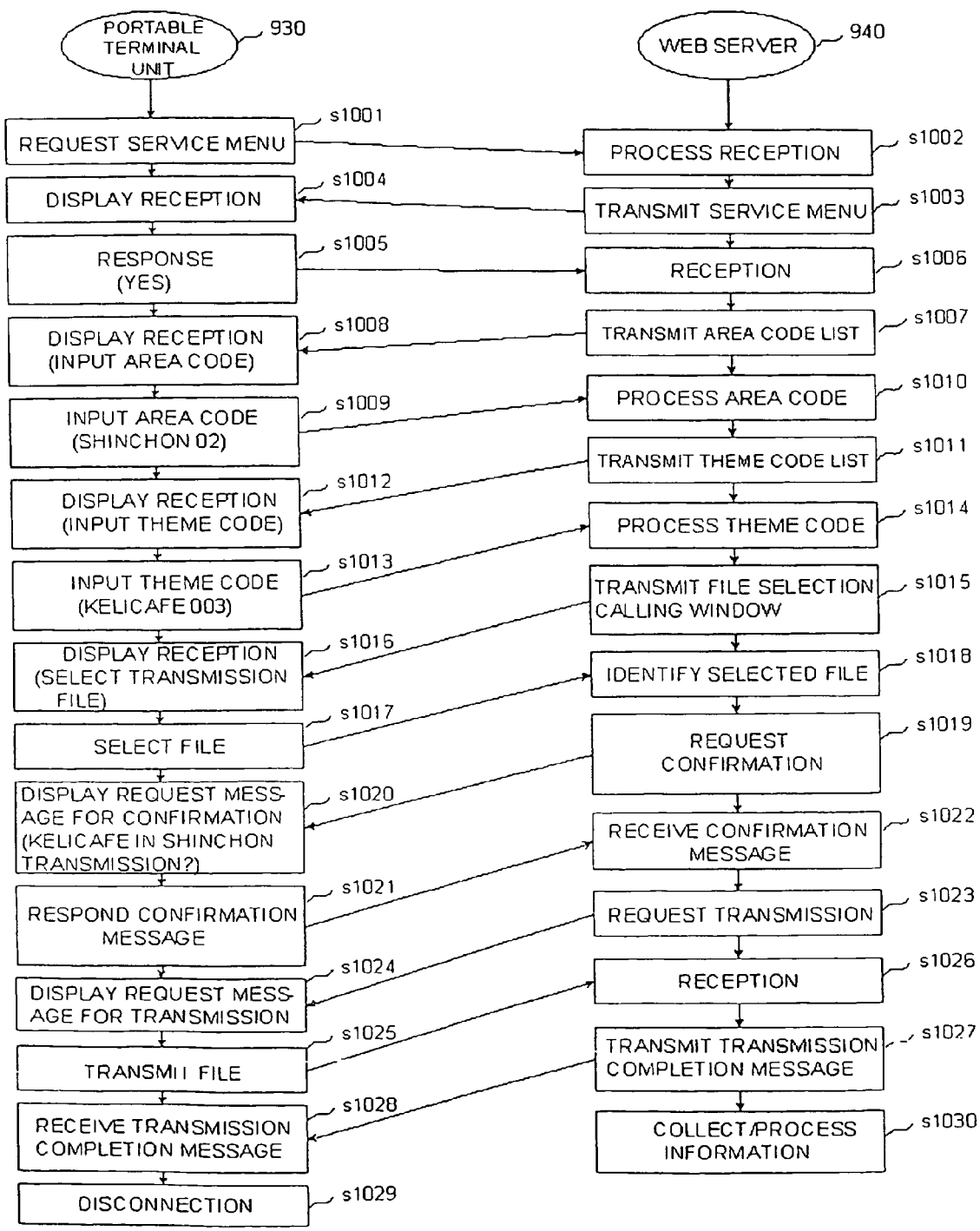
FIG. 11 is a flow chart exemplarily showing a method for transmitting an information file to an arbitrary portable terminal unit based on the real-time information management system of FIG. 10.

FIG. 11 is a flow chart showing a method for transmitting an information file from an arbitrary portable terminal unit to the web server by the real-time information management system of FIG. 10. Referring to FIG. 11, to transmit arbitrary status information data to the web server 940 using the separate portable terminal unit 910, the portable terminal unit 910 transmits a request message for service menu to the web server 940 in step s1001. Then, the we server 940 receives the request message in step s1002 and transmits a service menu in response to the request message in step s1003.

After receiving the service menu, the portable terminal unit 910 displays contents of the received service menu in step s1004 and transmits a response message ('YES') in step s1005.

In accordance with the response message, the web server 940 acknowledges that the portable terminal unit 910 has received the service menu, in step s1006. Then, the web server 940 transmits an area code list containing code information on each area to the portable terminal unit 910 in step s1007.

The portable terminal unit 910 receives the area code list and displays it on a screen, so that an information message that instructs input of a desired area code ('INPUT AREA CODE') is displayed in step s1008. Then, the portable terminal unit 910 is on standby until the user inputs the area code. If the user inputs the area code, such as 'SHINCHON 02', the portable terminal unit 910 transmits the code information to the web server 940 in step s1009.

After receiving and processing the area code in step s1010, the web server 940 transmits a theme code list containing code information on each theme to the portable terminal unit 910 in step s1011.

The portable terminal unit 910 receives the theme code list and displays it on the screen, so that an information message that instructs input of a desired theme code ('INPUT THEME CODE') is displayed in step s1012. Then, the portable terminal unit 910 is on standby until the user inputs the theme code. If the user inputs the theme code, such as 'KELI CAFÉ 003', the portable terminal unit 910 transmits the code information to the web server 940 in step s1013.

After processing the theme code in step s1014, the web server 940 transmits 'a file selection dialogue box' to the portable terminal unit 910 to select a file containing information to be provided by the portable terminal unit 910 in step s1015.

After receiving the file selection dialogue box and displaying it on the screen in step s1016, the portable terminal unit 910 is on standby until the user selects a desired file. If the user selects a desired file, the portable terminal unit 910 transmits the selected file information to the web server 940 in step s1017.

The web server 940 identifies the file selected by the portable terminal unit 910 in step s1018 and transmits a request message for confirmation of selecting the corresponding file in step s1019.

The portable terminal unit 910 receives the request message for confirmation (for example, 'KELI CAFÉ IN SHINCHON, TRANSMISSION?) and displays it on the screen in step s1020. Then, the portable terminal unit 910 is on standby until the user responds to the message. If the user inputs 'YES' in response to the message, the portable terminal unit 910 transmits the confirmation message 'YES' to the web server 940 in step s1021.

After receiving the confirmation message in step s1022, the web server 940 transmits a request message for transmission to the portable terminal unit 910 in step s1023.

The portable terminal unit 910 displays the request message for transmission received from the web server 940 on the screen in step s1024 and transmits the corresponding file in step s1025.

The web server 940 receives the file in step s1026. If transmission of the file is completed, the web server 940 transmits a transmission completion message to the portable terminal unit 910 in step s1027, and collects and processes the received information in step s1030.

After receiving the transmission completion message in step s1028, the portable terminal unit 910 disconnects the web server 940 in step s1029.

INDUSTRIAL APPLICABILITY

As aforementioned, the apparatus and method for providing real time information in accordance with the present invention has the following advantages.

Unlike the related art method for providing newspapers and broadcasting information through a separate editing step after collecting data, status information data generated by simple editing step are directly provided on a web site with collecting data, so that the time needed to provide services after collecting the data can be reduced. Furthermore, the data for one theme are provided to the user by a vertical arrangement structure based on temporal information, unlike contents service of the related art horizontal arrangement structure. This enables the user to first view the latest temporal information. Accordingly, arbitrary information users can timely use various and vivid news or information data at desired time.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. An apparatus for providing real time information comprising:
   a processor coupled to a memory;
   a data receiver receives status information data and an information user's data request message on the status information data in real time, the status information data consisting of either video data or data obtained by combining video data with at least one of audio data and text data and the status information data being indicative of temporal status information on an arbitrary area and theme;
   a data base management system (DBMS) sorts the status information data received through the data receiver in accordance with a corresponding area and theme and manages them in a temporal order;
   a data base (DB) retrieval unit extracts status information data corresponding to the theme and area selected by the information user from the DBMS, as the data request message is received through the data receiver;
   a data transmitter transmits the status information data extracted from the DB retrieval unit to the information user;
   a controller controls the data transmitter, the data receiver, the DB retrieval unit, and the DBMS to manage the status information data for the area and theme based on the temporal order and to provide the information user with corresponding status information data, as the data request message is received from an arbitrary information user, the controller selects only a latest status information data from a list of the extracted status information data to provide to the arbitrary information user, the controller selects the latest status information data only from a list of the status information data extracted from the DB retrieval unit to provide the information user with the selected information; and
   sequentially providing the information user with previous status information data included in the list of the status information data by selection of the information user as the information user requests additional status information data.

2. The apparatus of claim 1, wherein the controller performs authentication on the status information data received through the data receiver to add the authentication result to the status information data and store it in the DBMS, and controls the status information data so as not to provide the information user with the status information data which have not been authenticated.

3. The apparatus of claim 1, further comprising a temporal information processor for comparing current temporal information t1 managed by the apparatus with current temporal information t2 of an external terminal unit that provides the status information data, as the current temporal information t1 is different from the current temporal information t2, the temporal information included in the status information data received from the external terminal unit is varied by a difference value between t1 and t2.

4. The apparatus of claim 3, wherein the temporal information processor varies the current temporal information t2 of the external terminal unit based on the current temporal information t1 managed by the apparatus.

5. The apparatus of claim 1, further comprising an information provider management unit for identifying an information provider that provides the status information data, counting a number of uploaded information data and a number of hit information data for a corresponding information provider, and calculating a fee to pay a cost to the information provider in accordance with the counted result.

6. The apparatus of claim 1, wherein the status information data includes:
   a status information field indicative of status information on an arbitrary area and theme by either the video data or data obtained by combining the video data with at least one of the audio data and the text data;
   an area information field indicative of area information on an area where the status information data are generated;
   a temporal information field indicative of temporal information as the video data are generated; and
   a theme field indicative of a theme of the status information data.

7. The apparatus of claim 1, wherein the controller performs authentication on the status information data received through the data receiver to add the authentication result to the status information data and store it in the DBMS, and controls the status information data so as not to provide the information user with the status information data which have not been authenticated.

8. A method for providing real time information comprising the steps of:
   a) receiving status information data indicative of temporal status information on an arbitrary area and theme, the status information consisting of either video data or data obtained by combining video data with at least one of audio data and text data, sorting the status information data in accordance with an area and theme, and establishing a database in real time, in which the status information data corresponding to the arbitrary area and theme are temporally aligned;
   b) retrieving the database as an information user's data request message on arbitrary status information data stored in the data base is received, and extracting a list of the status information data on an area and theme selected by the information user;
   c) selecting only a latest status information data from the list of the status information data extracted in the step b) and providing the information user with the latest information; and
   d) sequentially providing previous information included in the list of the status information data by selection of the information user as the information user requests additional information on corresponding status information.

9. The method of claim 8, further comprising the step of e) judging contents of the status information data received in the step a), performing authentication on the status information data as authentication is required generating authentication information, and adding the authentication information to the status information data.

10. The method of claim 9 the steps c) and d) respectively include the step of confirming the authentication information as the authentication information is added to the extracted status information data, so as not to provide the information user with information that have not been authenticated.

11. The method of claim 8, further comprising the steps of:
  f) identifying an information provider that provides the status information data to count the number of uploaded information data and the number of hit information data for a corresponding information provider;
  g) calculating a fee to pay a cost to the information provider in accordance with the counted result; and
  h) establishing and managing a database on the fee for each information provider.

12. The method of claim 8, further comprising the steps of:
  i) comparing current temporal information ti internally managed with current temporal information t2 of an external terminal unit that generates the status information data;
  j) varying the temporal information included in the status information data received from the external terminal unit by the difference value as the current temporal information t1 is different from the current temporal information t2; and
  k) varying the current temporal information t2 based on the current temporal information t1 at the request of the external terminal unit.

* * * * *